(12) United States Patent
Boyd et al.

(10) Patent No.: US 9,869,401 B1
(45) Date of Patent: Jan. 16, 2018

(54) SPLIT BOBBIN CLUTCH FOR BYPASS PLUNGERS

(71) Applicant: Flowco Production Solutions, LLC, Spring, TX (US)

(72) Inventors: Garrett S. Boyd, Godley, TX (US); Mitchell A. Boyd, Haslet, TX (US)

(73) Assignee: Flowco Production Solutions, LLC, Spring, TX (US)

( * ) Notice: Subject to any disclaimer, the term of this patent is extended or adjusted under 35 U.S.C. 154(b) by 0 days.

(21) Appl. No.: 15/407,851

(22) Filed: Jan. 17, 2017

Related U.S. Application Data

(60) Provisional application No. 62/414,336, filed on Oct. 28, 2016.

(51) Int. Cl.
| | | |
|---|---|---|
| *F04B 47/12* | (2006.01) | |
| *F16K 15/06* | (2006.01) | |
| *E21B 43/12* | (2006.01) | |
| *E21B 34/14* | (2006.01) | |
| *F16D 63/00* | (2006.01) | |

(52) U.S. Cl.
CPC .............. *F16K 15/06* (2013.01); *E21B 34/14* (2013.01); *E21B 43/121* (2013.01); *E21B 43/123* (2013.01); *F16D 63/008* (2013.01)

(58) Field of Classification Search
CPC ...... E21B 43/121; E21B 34/14; E21B 43/123; E21B 43/122; E21B 43/12; F04B 47/12; F16K 16/05; F16D 63/008
See application file for complete search history.

(56) References Cited

U.S. PATENT DOCUMENTS

| | | | |
|---|---|---|---|
| 5,417,291 A * | 5/1995 | Leising | ................ E21B 17/046 166/184 |
| 7,383,878 B1 | 6/2008 | Victor | |
| 2004/0017049 A1 | 1/2004 | Fink | |
| 2005/0241819 A1 | 11/2005 | Victor | |
| 2007/0124919 A1 | 6/2007 | Probst | |
| 2012/0305236 A1 | 12/2012 | Gouthaman | |
| 2013/0133876 A1 | 5/2013 | Naedler et al. | |
| 2014/0116714 A1* | 5/2014 | Jefferies | ................ E21B 34/14 166/330 |
| 2015/0167428 A1 | 6/2015 | Hofman et al. | |
| 2016/0061012 A1* | 3/2016 | Zimmerman, Jr. | ... E21B 43/121 166/329 |
| 2016/0238002 A1* | 8/2016 | Williams | ................ F04B 53/14 |
| 2017/0058651 A1* | 3/2017 | Damiano | ................ E21B 33/12 |

OTHER PUBLICATIONS

HPAlloys Website Printout for Monel K500 (2004).*
Smalley Steel Ring Compan; Hoopster® Retaining Rings; product brochure (website); 3 pages; printed May 12, 2017; www.smalley.com/retaining-rings/hoopster-retaining-rings.

* cited by examiner

*Primary Examiner* — George S Gray
(74) *Attorney, Agent, or Firm* — Stephen Mosher

(57) ABSTRACT

A clutch assembly formed as a circular split bobbin assembly for resisting reciprocating motion of a shift rod or dart valve stem in a bypass plunger. The split bobbin may include at least one circumferential groove disposed in its outer radius, and a tension band member disposed in each circumferential channel to secure the split bobbin assembly around the shift rod or valve stem and wherein the tension band member has a cross section aspect ratio R<1.

8 Claims, 5 Drawing Sheets

US 9,869,401 B1

SPLIT BOBBIN CLUTCH FOR BYPASS PLUNGERS

CROSS REFERENCE TO RELATED APPLICATIONS

The present U.S. Patent Application claims priority to U.S. Provisional Patent Application Ser. No. 62/414,336 filed Oct. 28, 2016 by the same inventors and entitled SPLIT BOBBIN CLUTCH FOR BYPASS PLUNGERS, incorporated herein by reference. The present Application is also related to U.S. patent application Ser. No. 15/048,408 filed Feb. 19, 2016 and entitled UNIBODY BYPASS PLUNGER WITH CENTRALIZED HELIX AND CRIMPLE FEATURE, and also related to U.S. patent application Ser. No. 15/048,467 filed Feb. 19, 2016 and entitled IMPROVED CLUTCH ASSEMBLY FOR BYPASS PLUNGERS, and also related to U.S. patent application Ser. No. 15/048,491 filed Feb. 19, 2016 and entitled IMPROVED DART VALVES FOR BYPASS PLUNGERS, filed concurrently herewith the same inventors.

BACKGROUND OF THE INVENTION

1. Field of the Invention

The present invention generally relates to bypass plungers of the type having a dart valve or shift rod and more particularly having a split bobbin clutch assembly for resisting the reciprocating motion of the dart valve or shift rod during the operation of the bypass plunger.

2. Background of the Invention and Description of the Prior Art

A conventional bypass plunger is a device that is configured to freely descend and ascend within a well tubing, typically to restore production to a well having insufficient pressure to lift the fluids to the surface. It may include a self-contained valve—also called a "dart" or a "dart valve" in some embodiments—to control the descent and ascent. Typically the valve is opened to permit fluids in the well to flow through the valve and passages in the plunger body as the plunger descends through the well. Upon reaching the bottom of the well, the valve is closed, converting the plunger into a piston by blocking the passages that allow fluids to flow through the plunger. With the plunger converted to a piston, blocking the upward flow of fluids or gas, the residual pressures in the well (also described as the pressure differential) may then increase enough to lift the plunger and the volume of fluid above it toward the surface. Simply stated, upon reaching the surface, the fluid is passed through a conduit for recovery, the valve in the plunger is opened by a striker mechanism, and the plunger descends to repeat the cycle.

In a typical bypass plunger one valve embodiment is similar to a poppet valve, with a valve head attached to one end of a valve stem like the intake valve of an internal combustion engine. The valve head, at the inward end of the stem, may be configured to contact a valve seat within the hollow body of the plunger. The stem protrudes outward of the bottom end of the plunger body. A clutch device may surround the stem of the valve to retard and control the motion of the stem and thereby maintain the valve in an open or closed configuration during the respective descent or ascent of the plunger. The valve thus reciprocates to open the flow passages at the surface when the plunger contacts the striker mechanism, and to close the bypass passages at the bottom of the well when the valve stem (or shift rod in some applications) strikes the bottom, usually at a bumper device positioned at the bottom of the well. Descent of the plunger is controlled by gravity, which pulls it toward the bottom of the well when the valve is open.

This valve or "dart" may be held open or closed by the clutch—typically a device that exerts circumferential friction around the valve stem or shift rod. The dart may be held within a hollow cage attached to the plunger by a threaded retainer or end nut at the lower end of the plunger assembly. Thus, the valve reciprocates between an internal valve seat (valve closed) in a hollow space inside the cage and an inside bulkhead or other surface within the lower end of the cage (valve open). A conventional clutch may be formed of a bobbin split into two cylindrical halves and surrounded by one or two elastic bands—typically ordinary coil springs that function as a sort of garter to clamp the stem of the valve or dart between the two halves of the bobbin, thereby resisting the reciprocating motion of the stem within the bobbin. The clutch assembly is typically held in a fixed position within the cage. Each 'garter' spring is prepared by crimping the ends of the coil spring together before wrapping the crimped springs around the split bobbin assembly. Crimping the ends of the coil spring together is typically a hand operation that is subject to variability in the tension around the bobbin halves and possible failure of the crimped joint, which could affect the reliability of the clutch when in a down hole environment. Such a clutch may be appropriate for some applications, especially when its assembly is well controlled to produce uniform assemblies.

However, while generally effective in lifting accumulated fluids and gas of unproductive wells such conventional bypass plungers tend to suffer from reliability problems in an environment that subjects them to high impact forces, very caustic fluids, elevated temperatures and the like. The typical materials used for the elastic bands that surround the split bobbin each have a characteristic suitable for use in these types of clutches, but each also has a disadvantage that usually results in a clutch that has a useful life that is far more limited than that of the bypass plunger with which it is combined. For example, coil springs are effective and resistant to chemicals but cumbersome to install, and they are susceptible to breakage in hard impacts and clogging by sand particles. Elastomeric rings such as O-rings overcome some weaknesses of coil springs but are often damaged when high temperatures downhole are encountered. Snap rings are resistant to impact, chemicals and high temperatures, but they are less flexible because they have an elliptical deformation range that is too narrow to enable effective clutch action.

Various solutions and types of materials have been employed to simplify construction of the dart valve type of bypass plungers, improve their reliability and performance, and to reduce their cost of manufacture. However, failures remain common, and a substantial need exists to eliminate the causes of these failures. What is needed is a bypass plunger design that solves the structural problems with existing designs and provides a more reliable and efficient performance in the downhole environment.

SUMMARY OF THE INVENTION

Accordingly there is provided a clutch assembly for resisting the reciprocating motion of a shift rod or dart valve stem in a bypass plunger, comprising a clutch body formed as a circular split bobbin assembly having first and second cylindrical halves; at least one circumferential channel disposed in the surface defined by the outer radius of the split bobbin assembly; and a tension band disposed in each circumferential channel to secure the split bobbin assembly around the shift rod or valve stem wherein the tension band has a cross section aspect ratio R<1.

In one aspect of the embodiment the aspect ratio R is defined by the relationship R=radial thickness÷axial thickness of the tension band member.

DETAILED DESCRIPTION OF THE INVENTION

Accordingly there is provided an advance in the state of the art of split bobbin clutches wherein the traditional garter spring is replaced by tension bands. A tension band is a circular band of a resilient material forming a circular spring and having a gap at one location in its circumference. As described herein, tension bands are more durable, are easier to install during manufacture, and provide more consistent control of the operation of the clutch, even under the most severe conditions of use as part of a bypass plunger. By way of example, the tension bands may be formed of flat wire spring stock having an aspect ratio R of less than 1.0, that is, the thickness of the flat wire spring stock is less than the width of the flat wire spring stock used to form the tension bands. The aspect ratio relationship may be stated in compact form as R<A/B, where A=the thickness of the flat wire stock, B=the width of the flat wire stock, and R is the aspect ratio. The tension bands are formed according to a spring constant suited to the particular clutch application, with further attention to the elliptical deformation behavior of the tension band under operating conditions. The gap in the circumference of the tension band is similar to the gap in a split ring. The gap allows the tension band to expand and contract as it is placed around the bobbin in the circumferential channel(s) around the outer diameter of the bobbin. As installed and in use, the gap allows similar expansion and contraction as the dart valve or shift rod reciprocates within the clutch assembly of the plunger.

Figure 1:
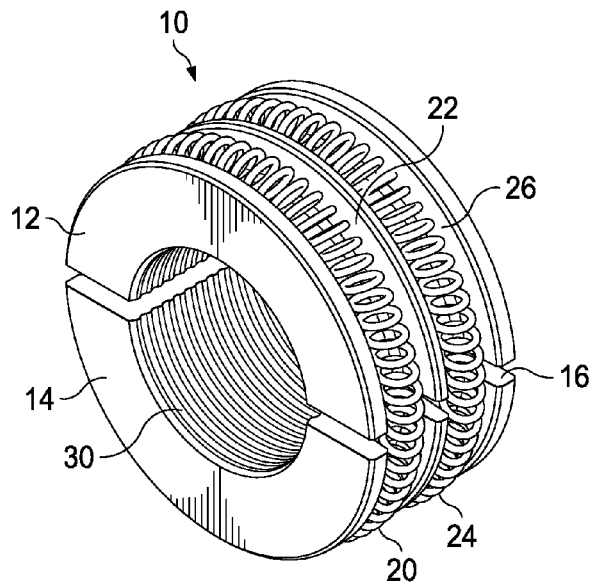
FIG. 1 illustrates a prior art clutch assembly configured as a split bobbin surrounded by coil springs acting as garter springs.

FIG. 1 illustrates a typical prior art clutch assembly 10 configured as a split bobbin surrounded by coil springs acting as garter springs. The bobbin halves 12, 14 are disposed relative to each other across a gap 16 when held in place around a dart valve stem 82 (see FIG. 8) or shift rod 124 (see FIG. 9) by garter springs 20, 24 disposed in channels 22, 26 respectively. The inner diameter of the split bobbin assembly 10 may include some particular surface profile 30 depending on the application.

Figure 2:
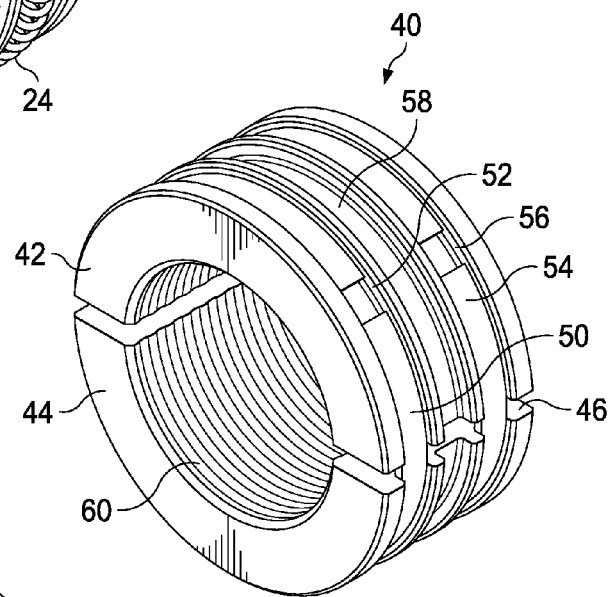
FIG. 2 illustrates a split bobbin clutch assembly using a pair of tension bands surrounding the split bobbin halves according to the present invention.

FIG. 2 illustrates a split bobbin clutch assembly 40 using a pair of tension bands 50, 54 surrounding the split bobbin halves 42, 44 according to the present invention. The split bobbin clutch assembly 40 is shown in a perspective view, with three circumferential channels 52, 56, 58 surrounding the outer diameter of the bobbin halves 42, 44. The circumferential channels 52, 56, 58 are configured—as deep or as shallow as needed—to receive the tension bands within them. Shown installed in the outer channels 52, 58 surrounding the outer circumference of the split bobbin assembly 40 are two tension bands 50, 54. The inner diameter of the bobbin halves 42, 44 may include a particular surface profile 60 as shown.

Figure 3:
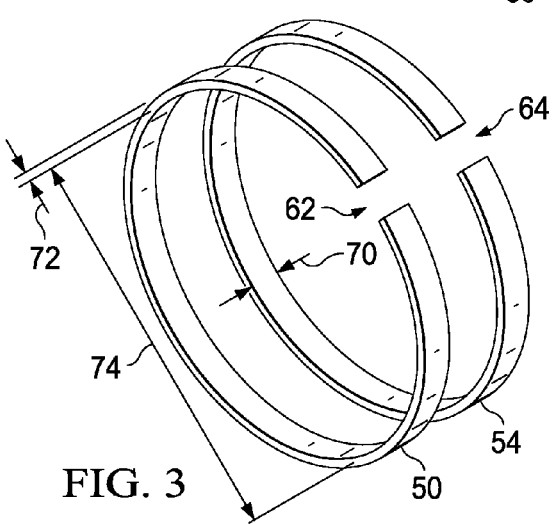
FIG. 3 illustrates a pair of tension bands for a split bobbin clutch assembly according to the embodiment shown in FIG. 2.

FIG. 3 illustrates the tension bands 50, 54 for use with a split bobbin clutch assembly 40 according to the embodiment shown in FIG. 2. The tension bands 50, 54 are each characterized by a respective gap 62, 64, an axial width 70, a radial thickness 72, and an inside diameter Di (74). The inside diameter Di (74) is the diameter of the tension band in its relaxed or "free" state, that is when it is not being expanded as when it is disposed in a channel around a clutch bobbin installed on a dart valve stem or a shift rod of a plunger. The relationship of the radial dimension 72 ("A," which represents the thickness of the tension band member) to the axial dimension 70 ("B," which represents the width of the tension band member) is called an aspect ratio R, where R=A÷B. In the present invention, R<1, that is, the thickness of the tension band member is always less than the width of the tension band member. This characteristic where R<1 enables a tension band that has an easily controlled spring constant to ensure a predictable and resilient tension around the split bobbin assembly over a wide range of impacts imparted to the split bobbin clutch assembly 40 as a plunger and its dart valve or shift rod descends or ascends within a well bore. This spring constant—and the resulting tension exerted by the tension bands—can be varied over a wide range to satisfy a variety of conditions and applications by suitable selection of material, the dimensions A, B, and Di, and the process used to manufacture the tension bands. The associated dimensions of the split bobbin halves may also be adjusted to accommodate the dimensions of the tension bands.

The tension band as described herein thus acts as a shock absorber that is superior in its performance to the conventional "garter spring" used to hold the split bobbin halves together. Because of their simple shape and configuration the tension bands 42, 44 withstand greater abuse without failure, even in the presence of elevated temperatures or high sand concentrations, harsh or toxic chemicals, etc. encountered in oil or gas wells. Moreover, the tension bands 42, 44 as described herein are also much simpler to manufacture and install on a split bobbin because of their shape and configuration. The tension bands 42, 44 do not require connecting the ends together as in the case of garter springs, which must be carefully screwed together and crimped during assembly onto the split bobbin assembly.

Figure 4:
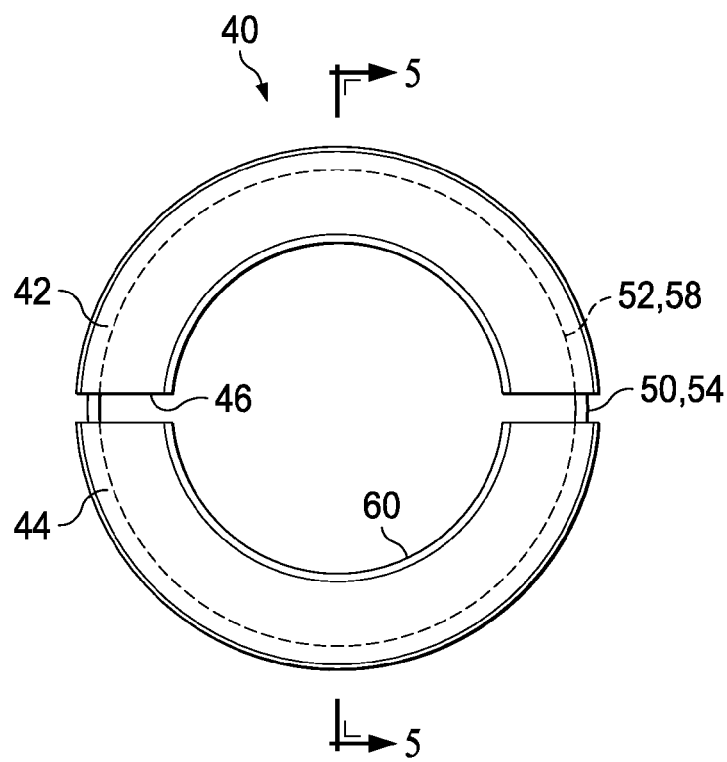
FIG. 4 illustrates a side view of a split bobbin assembly with tension bands installed in the circumferential grooves as used in the embodiment of FIG. 2.

FIG. 4 illustrates a side view of the split bobbin clutch assembly 40 of FIG. 2, including the gap 46, and the surface profile 60 of the inside diameter of the assembled bobbin halves 42, 44. This view also includes the tension bands 50, 54 installed in the respective circumferential channels 52, 58. The tension band 50 is visible in the gap 46 and the circumferential channels are indicated by the dashed line within the outer perimeter of the split bobbin assembly 42, 44.

Figure 5:
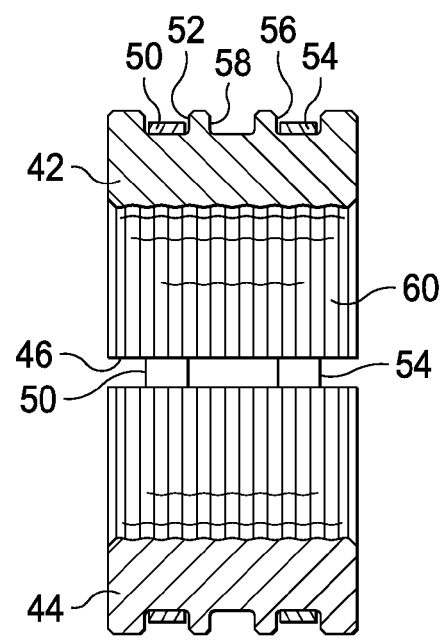
FIG. 5 illustrates a cross section view of the split bobbin of FIG. 2 depicting the relationship of the circumferential channels and the tension bands, also in cross section, as installed on the bobbin.

FIG. 5 illustrates a cross section view of the split bobbin clutch assembly 40 of FIG. 2 to show the relationship of the circumferential channels 52, 56 and 58 and the tension bands 50, 54 installed in their respective circumferential channels 52, 56 as installed on the bobbin halves 42, 44.

Figure 6:
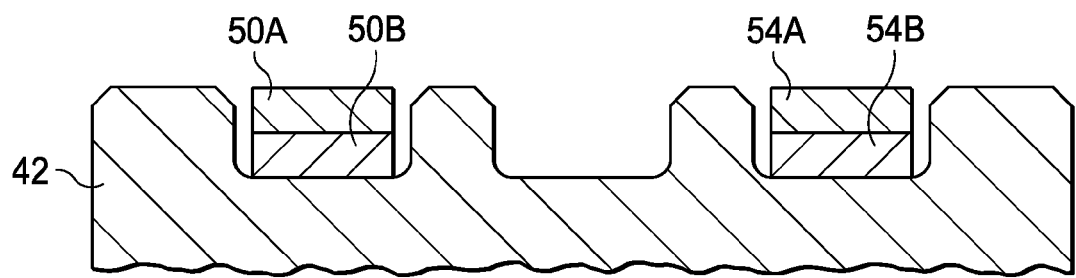
FIG. 6 illustrates a cross section view similar to FIG. 5 except it depicts two tension bands in each circumferential groove, one ring "stacked" over the other.

FIG. 6 illustrates a partial cross section view of the bobbin half 42 similar to FIG. 5 except it depicts two tension bands, one 50A "stacked" over the other 50B in the circumferential channel 52 and, similarly, one 54A stacked over the other 54B in the circumferential channel 56. This illustration shows how more than one tension band may be used to adjust the clutch performance when greater tension is required than can be provided by single tension bands disposed in each circumferential channel.

Figure 7:
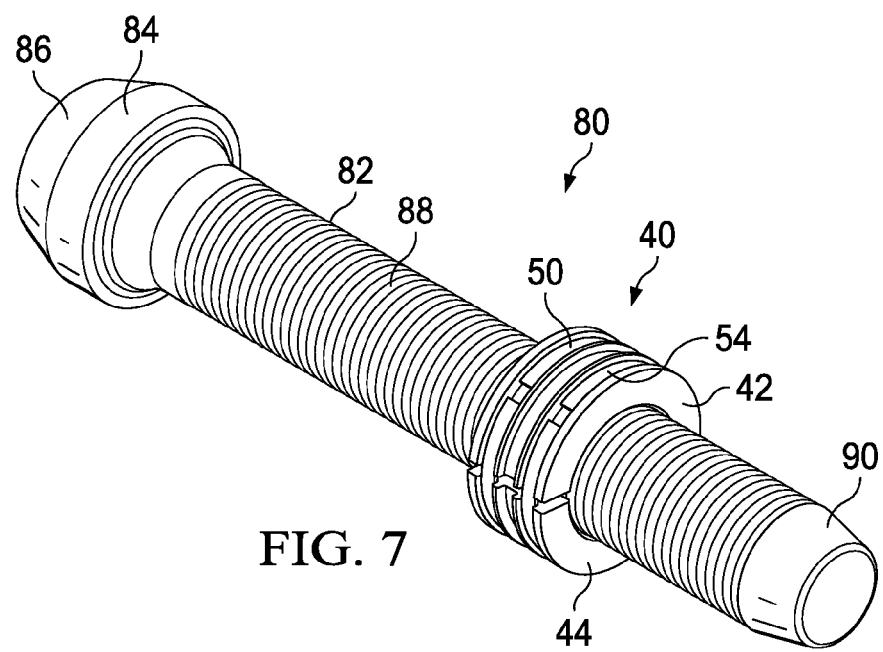
FIG. 7 illustrates an isometric view of a dart valve and a split bobbin clutch assembly using tension bands according to the present invention.

FIG. 7 illustrates an isometric view of a split bobbin clutch assembly 40 installed on the valve stem 88 of a dart valve 82. The clutch assembly 40 uses tension bands 50, 54 installed surrounding split bobbin halves 42, 44 according to the present invention. The dart valve 82 includes a valve head 84 shaped with a valve face 86, a valve stem 88 having a conical tip 90 at the end of the valve stem 88 opposite the valve head 84.

Figure 8:
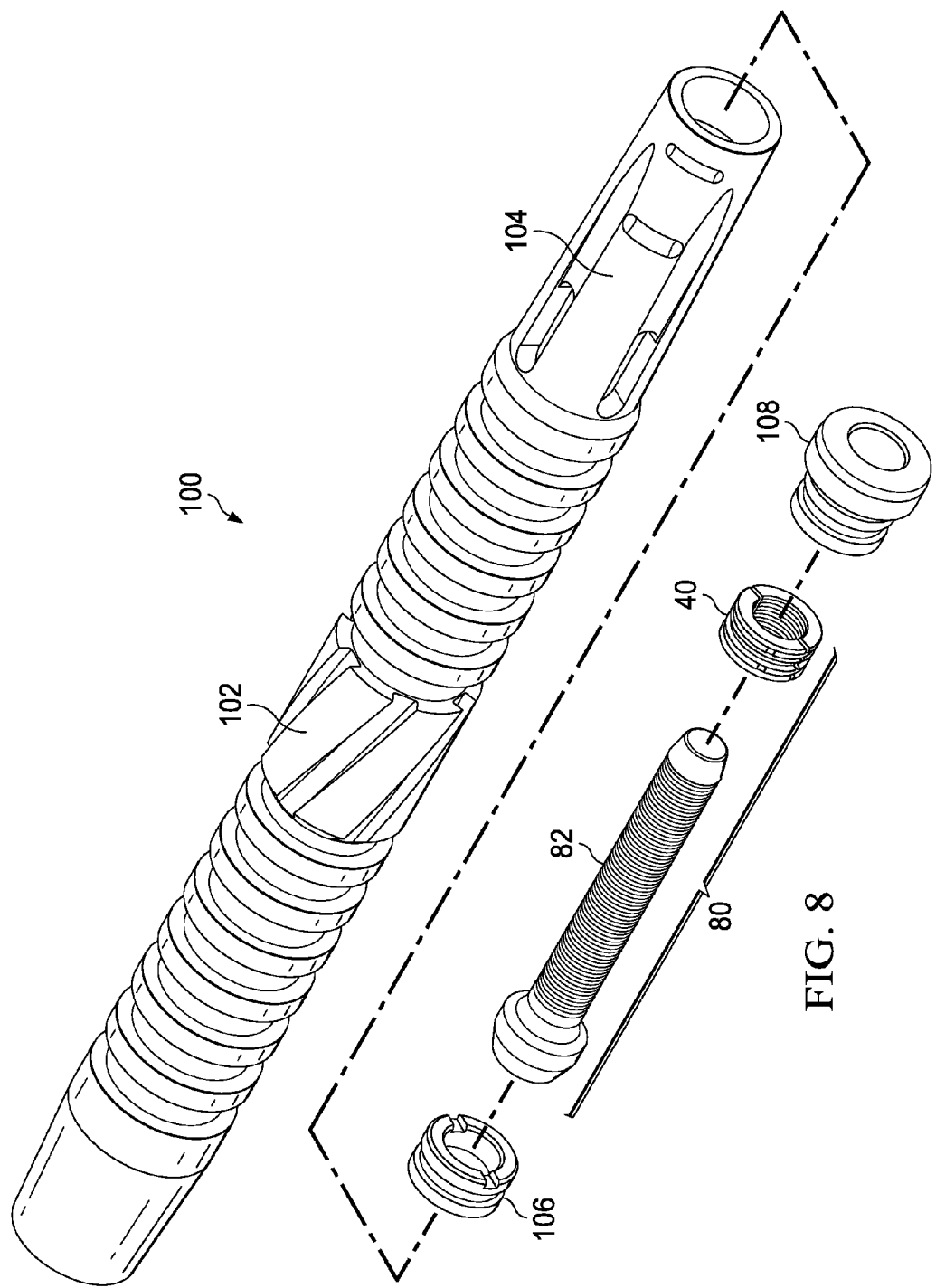
FIG. 8 illustrates an exploded isometric view of a bypass plunger using a dart valve and split bobbin clutch assembly according to the present invention.

FIG. 8 illustrates an exploded isometric view of a bypass plunger 100 using a dart valve assembly 80 that includes a split bobbin clutch assembly 40 equipped with tension bands (see FIGS. 2 and 7) according to the present invention. The plunger body 102 includes a dart valve cage 104, which, in this example, includes a partition nut 106, the dart valve 82, a split bobbin clutch assembly 40 and an end nut 108 that secures the dart valve assembly 80 within the valve cage 104. The partition nut 106 provides a bulkhead structure that positions the clutch assembly within the valve cage 104, between the partition nut 104 and the end nut 108.

Figure 9:
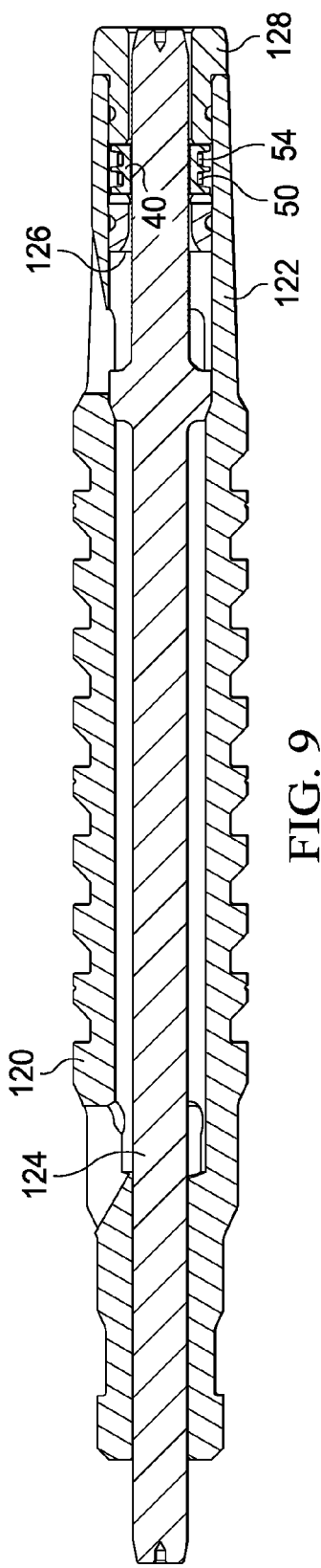
FIG. 9 illustrates a shift rod plunger assembly in cross section depicting the relationship of its shift rod with a split bobbin/tension band clutch in a typical bypass plunger.

FIG. 9 illustrates an alternate embodiment of the use of the split bobbin clutch assembly 40 equipped with tension bands 50, 54 according to the present invention. In this view, the shift-rod-type plunger body 120 is shown in cross section depicting the relationship of its shift rod 124 with a split bobbin clutch assembly 40 disposed between a partition nut 126 and an end nut 128 within the valve cage 122 of a typical bypass plunger.

Analysis of the frequent and often costly failures of the conventional forms of tensioning devices for split bobbin clutches necessitated the different approach taken in the invention disclosed herein. The benefits and advantages of the resulting solution include a longer life, improved control of the clutch action, and a simpler component that is less expensive to manufacture and easier to install or replace. The tension bands described herein, which can be formed from a variety of metal or non-metallic materials, withstand abusive conditions such as elevated temperatures, caustic chemicals, high velocity impacts, and are virtually immune to clogging by sand and other particulate matter. The use of a band configuration having an aspect ratio of its cross section of R<1 (instead of R>1 as in snap rings, for example) means that the tension provided by the tension band, an attribute of the spring constant, can have a wider, more linear range of tension in a single band, thus providing a more flexible, more predictable and uniform tension of the split bobbin clutch on the dart valve stem or shift rod. This predictability ensures that the clutch more reliably retains the valve in the closed and open positions during operation of the plunger. The small radial dimension (thickness=A) of the tension band as compared with its larger axial (width=B) dimension provides the option of using more than one band in each circumferential channel, thus extending the range of tensions in a simple way.

The simple structure of the tension ring is very easy and inexpensive to manufacture and install, and thereby reduces costs of manufacture and installation. Also, the tolerances of the dimensions and the spring constant can be more closely and simply controlled for the tension bands as described herein. Moreover, its greater durability reduces the need for frequent replacement as is the case with other types of tensioning devices such as elastomeric garters (including O-rings), coil springs, etc.

While the invention has been shown in only one of its forms, it is not thus limited but is susceptible to various changes and modifications without departing from the spirit thereof.

What is claimed is:

1. A clutch assembly for resisting the reciprocating motion of a shift rod or dart valve stem in a bypass plunger, comprising:
   a clutch body formed as a circular split bobbin assembly having first and second cylindrical halves;
   at least one circumferential channel disposed in a surface defined by the outer radius of the split bobbin assembly; and
   a tension band disposed in each circumferential channel to secure the split bobbin assembly around the shift rod or dart valve stem wherein the outer radius of each tension band is less than the outer radius of the split bobbin assembly and wherein each tension band has a gap in its circumference and a cross section aspect ratio R<1.

2. The clutch assembly of claim 1, wherein the tension band comprises:
   a circular member formed of metal wherein the aspect ratio R is defined by R=A÷B where A=thickness and B=width of the tension band.

3. The clutch assembly of claim 1, wherein the tension band comprises:
   a circular member formed of non-metallic material wherein the aspect ratio R is defined by R=A÷B where A=thickness and B=width of the tension band.

4. The clutch assembly of claim 1, wherein the circumferential channel comprises:
   a cut out portion disposed around the outer circumference of the split bobbin halves and having a U-shaped cross section of sufficient depth to receive one or more tension bands therein.

5. The clutch assembly of claim 1, further comprising:
   at least first and second circumferential channels each having a tension band disposed therein.

6. The clutch assembly of claim 1, further comprising:
   at least first and second circumferential channels each having one or more tension bands disposed therein.

7. The clutch assembly of claim 1, further comprising:
   at least three circumferential channels surrounding the outer circumference of the split bobbin for receiving one or more tension bands disposed therein.

8. A clutch assembly for resisting the reciprocating motion of a shift rod or dart valve stem in a bypass plunger, comprising:
- a clutch body formed as a circular spilt bobbin assembly having first and second cylindrical halves;
- at least one circumferential channel disposed in a surface defined by the outer radius of the split bobbin assembly; and
- at least first and second tension bands stacked in each circumferential channel to secure the spilt bobbin assembly around the shift rod or dart valve stem;
- wherein each tension band includes a gap in its circumference and a cross section aspect ratio $R<1$.

* * * * *